United States Patent Office 3,465,424
Patented Sept. 9, 1969

3,465,424
METHOD OF FORMING GLASS COATED STEEL ARTICLES
Wayne A. Deringer, Milwaukee, Wis., assignor to A. O. Smith Corporation, Milwaukee, Wis., a corporation of New York
No Drawing. Filed Jan. 26, 1967, Ser. No. 611,844
Int. Cl. B23p 17/04, 17/00, 25/00
U.S. Cl. 29—527.2     5 Claims

ABSTRACT OF THE DISCLOSURE

This invention relates to a method of fabricating contoured glass coated articles from generally flat, steel plates by initially applying a coating of glass to the steel plate, firing the coated steel plate at an elevated temperature to fuse the glass to the steel and then adjusting the temperature of the glass coated steel plate to a value in the range of 400° to 600° F. below the optimum firing temperature of the glass. While at this temperature, the plate is bent or worked to the desired contour.

---

Curved or contoured glass coated steel plates are used in the fabrication of large storage vessels, such as silos or tanks or in the fabrication of smokestacks. In the past, the curved glass coated steel plates have been formed by initially bending or rolling the flat steel plate to the desired curvature and then glass coating the curved plate. Under conventional procedures, the plate is bent prior to glass coating because once the glass is fused to the steel and cooled to room temperature, the plate cannot be bent without the glass coating cracking or crazing. The glass coating of curved or contoured plates presents numerous problems from a production standpoint, for it is more difficult to run curved plates than flat plates through production lines which require successive steps of cleaning, applying the coating of glass and firing the plates. Furthermore, storage vessels or smokestacks are formed of various diameters so that a considerable inventory of curved plates of different curvatures is normally required.

The method of the invention is directed to forming a contoured glass coated steel article by initially applying a glass coating to a flat, steel plate or blank, and subsequently firing the plate at an elevated temperature to fuse the glass to the steel. Following the firing of the glass coating, the temperature of the glass coated plate is adjusted to a value in the range of 400° to 600° F. below the optimum firing temperature of the glass, and while the glass coated plate is at this temperature, the plate is bent or worked to the desired non-planar shape. It has been discovered that by bending or working the glass coated plate at this specific temperature range, the glass is flexible enough so that it will bend without cracking or crazing, and yet the glass is sufficiently hard so that it will not be marred by contact with the die and will not stick to the die surface.

The present invention eliminates the production problems associated with the glass coating of curved plates by applying the glass coating to flat plates. Under normal practice, the flat glass coated plates are stored in this condition and to fill an order, the plates are subsequently reheated to the specific temperature range and bent to the desired curvature. The process of the invention simplifies the storage and handling of the glass coated plates and eliminates the usual large inventory of glass coated plates of various curvatures.

The steel base to be coated with the glass or vitreous enamel is generally a low carbon steel having a carbon content up to about 0.30% carbon.

The flat steel base or plate is initially cleaned by conventional procedures to remove the scale and foreign material. Sand blasting, grit blasting, pickling or the like, can be employed to clean the steel surface to be subsequently coated with the glass or vitreous enamel.

The glass or vitreous enamel is normally applied to the cleaned steel plate in the form of a slip or slurry by rolling, dipping, spraying, slushing or the like.

To form the slip, glass frit is milled with a conventional mill addition and a typical slip may have the following composition in parts by weight:

| | |
|---|---|
| Glass frit | 100.0 |
| $NaNO_2$ | 0.2 |
| Clay | 6.0 |
| Bentonite | 0.4 |
| Water | 45.0 |

The particular glass frit to be used is not critical to the invention, and any conventional glass frit commonly used in coating steel can be used, with the particular composition of the frit depending upon the steel composition, and the environment to which the glass coated article is to be subjected in service. Specific illustrations of conventional glass frits which can be employed are as follows in weight percent:

| | General composition | Specific formulation 1 | Specific formulation 2 |
|---|---|---|---|
| $Al_2O_3$ | 0-12 | 9 | 8 |
| $B_2O_3$ | 5-12 | 12 | 10 |
| $ZrO_2$ | 0-5 | | 3 |
| $TiO_2$ | 0-5 | 2 | 5 |
| $CaO$ | 0-8 | 2 | 6 |
| $BaO$ | 0-7 | 3 | 7 |
| $Na_2O$ | 8-14 | 11 | 12 |
| $K_2O$ | 0-10 | 3 | 2 |
| $MgO$ | 0-5 | 2 | |
| $Li_2O$ | 0-4 | 1 | 2 |
| $SiO_2$ | Balance | 56 | 45 |

While the use of a glass slip is the preferred method of coating the steel plate, in some cases a dry dust coating of the glass frit may be used in place of the slip.

The glass composition can be applied to one surface of the steel plate, or to both surfaces and to the plate edges, if desired, depending on the ultimate use of the glass coated article.

Following the application of the glass slip, the plate is heated to a temperature of about 300° F. to evaporate the water and subsequently the coated plate is fired at a temperature of about 1400° to 1600° F. for a period of about 5 to 10 minutes to fuse the glass to the steel.

Every glass has an optimum firing temperature which is defined as the midpoint of the temperature range at which the glass fires out. According to the invention, the temperature of the glass coated plate is adjusted to a value in the range of 400° to 600° below the optimum firing temperature of the glass and while at this working temperature the plate is bent to the desired curvature. The working temperature to which the glass coated plate is heated will generally be in the range of 900° to 1300° F., depending upon the particular glass composition, and for most glasses commonly used for coating steel the working temperature will be in the range of 1050° to 1250° F. When the glass coated plate is at this working temperature, 400° to 600° F. below the optimum firing temperature, the glass coated plate is bent by conventional rolling or die press techniques to the desired curvature or contour. After the bending operation, the glass coated plate is cooled to room temperature.

It has been found that if the working temperature of the glass coated plate is more than 600° below the optimum firing temperature, the glass is apt to crack on bending. If the glass coated plate is at a temperature less than 400° F. below the optimum firing temperature, the glass may tend to be marred by the dies and may stick to the die surfaces. Therefore it is important to the invention that the temperature of the glass coated plate be adjusted to this narrow range of 400° to 600° F. below the optimum firing temperature and bent or worked while at this temperature.

In most cases the glass coated steel plate will be cooled to room temperature after firing and subsequently reheated to the working temperature, but it is contemplated that in some instances the coated plate can be cooled from the firing temperature to the working temperature and then worked without cooling to room temperature and reheating.

The dies or other working members employed to form the glass coated plate should be fabricated of a non-oxidizing material such as stainless steel or nickel-chromium alloys. The use of oxidizable carbon steel dies may result in oxide scale from the dies adhering to the glass coating which is in a relatively tacky state during the working operation.

The dies or other working members employed to form the glass coating plate should have a substantial surface area to distribute the working pressure over a wide area of the glass coating and thus reduce the tendency of the glass coating to mar during the working operation.

The present invention departs from prior art practices and is based on the discovery that glass coated steel plates can be bent to the desired contour by adjusting the temperature of the plate to a specific working temperature in the range of 400° to 600° F. below the optimum firing temperature of the glass, and bending the glass coated plate while at this temperature. At this specific working temperature range, the glass is sufficiently fluid and flexible so that it will not crack on bending, and yet is sufficiently tough so it will not be marred by the dies nor stick to the die surface.

Curved glass coated plates formed by the method of the invention can be used in fabricating cylindrical storage structures such as silos, tanks or the like, as well as fabricating smoke stacks or other hollow members of smaller diameter.

As the plates or sheets are not bent to the desired contour or curvature until after the glass coating operation has been completed, the process of the invention substantially simplifies the production of the glass coated plates, for flat plates can be run through the production lines. Moreover, the process of the invention eliminates the customary inventory of glass coated sheets of various curvatures. The glass coated sheets are stored in the planar form. When an order is received for a series of plates of given curvature, the flat plates can then be heated to the working temperature and bent to the desired shape. This means that only flat sheets need to be stored and there is no requirement for storing a series of curved plates of various curvatures.

A specific example of the process of the invention is as follows:

A carbon steel 6" x 12" x .070" sheet of SAE 1020 carbon steel was initially cleaned by sand blasting. A conventional glass slip was applied to both surfaces of the steel plate and the glass slip had the following composition in weight percent:

| | |
|---|---|
| Glass frit | 100 |
| $NaNO_2$ | .1 |
| Clay | 7 |
| Bentonite | .5 |
| Water | 40 |

The glass frit used in the glass slip had the following composition in weight percent.

| | Percent |
|---|---|
| $SiO_2$ | 55 |
| $Al_2O_3$ | 5 |
| $B_2O_3$ | 8 |
| $Na_2O$ | 14 |
| $K_2O$ | 3 |
| $MgO$ | 4 |
| $BaO$ | 3 |
| $Li_2O$ | 0.5 |
| $MnO_2$ | 0.7 |
| $NiO_2$ | 0.8 |
| $CoO$ | 0.7 |
| $F_2$ | 5 |

The glass coated plate was initially dried at a temperature of 250° F. for 5 minutes, and after drying, the plate was then heated in a furnace to a temperature of 1580° F. and maintained at this temperature for 1 minute to fuse the glass to the steel. The glass coated plate was then cooled to room temperature. Subsequently, the plate was reheated to a temperature of 1080° F. and introduced into a die press having curved stainless steel die shoes. The glass coated plate while at this temperature was bent to a radius of curvature of 6 inches.

Following the bending, the glass coated plate was cooled to room temperature and the glass coating on the curved plate showed no evidence of marring or cracking, and there was no evidence of glass sticking to the die members.

I claim:
1. A process of fabricating a contoured glass coated steel article, comprising the steps of applying a glass composition to a surface of a steel article, heating the glass coated article to a temperature sufficiently high to fuse the glass to the steel, adjusting the temperature of the glass coated article to a working temperature in the range of 400° to 600° F. below the optimum firing temperature of said glass composition, and working the glass coated article to the desired contour while at said working temperature to produce the contoured glass coated steel article.

2. The process of claim 1 in which the steel article is a flat plate and said plate is bent to a nonplanar shape.

3. The process of claim 1 in which said working temperature is in the range of 900° to 1300° F.

4. The process of claim 1 in which said glass coated steel article is cooled to room temperature after the article is heated to fuse the glass to the steel, and the cooled article is subsequently reheated to said working temperature.

5. A method of fabricating a curved glass coated steel plate, comprising the steps of applying a glass composition to a surface of a generally flat steel plate, heating the glass coated plate to a firing temperature sufficiently high to fuse the glass to the steel, cooling the glass coated plate to room temperature, reheating the glass coated plate to a working temperature in the range of 400° to 600° F. below the optimum firing temperature of the glass composition, bending the glass coated plate while at said working temperature to the desired curvature, and thereafter cooling the curved glass coated plate to room temperature.

References Cited

UNITED STATES PATENTS

| 1,230,958 | 6/1917 | Warga | 117—129 |
| 2,927,869 | 3/1960 | Hortvet | 117—129 XR |

S. LEON BASHORE, Primary Examiner

S. R. FRIEDMAN, Assistant Examiner

U.S. Cl. X.R.

65—60; 72—46; 117—53, 129; 148—6